United States Patent
Van Der Sijde et al.

(10) Patent No.: US 11,184,552 B2
(45) Date of Patent: *Nov. 23, 2021

(54) ADAPTIVE LIGHT SOURCE

(71) Applicant: Lumileds LLC, San Jose, CA (US)

(72) Inventors: Arjen Gerben Van Der Sijde, Aachen (DE); Nicola Bettina Pfeffer, Aachen (DE); Quint Van Voorst Vader, Aachen (DE); Yourii Martynov, Aachen (DE); Charles André Schrama, Aachen (DE)

(73) Assignee: Lumileds LLC, San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/597,978

(22) Filed: Oct. 10, 2019

(65) Prior Publication Data

US 2020/0154027 A1 May 14, 2020

Related U.S. Application Data

(63) Continuation of application No. 15/591,040, filed on May 9, 2017, now Pat. No. 10,484,616, which is a (Continued)

(30) Foreign Application Priority Data

Mar. 1, 2016 (EP) .................................... 16158004

(51) Int. Cl.
*H04N 5/235* (2006.01)
*H04N 5/225* (2006.01)
(Continued)

(52) U.S. Cl.
CPC .......... *H04N 5/2354* (2013.01); *G03B 15/05* (2013.01); *G06K 9/00201* (2013.01);
(Continued)

(58) Field of Classification Search
CPC combination set(s) only.
See application file for complete search history.

(56) References Cited

U.S. PATENT DOCUMENTS

| | | |
|---|---|---|
| 7,747,157 B2 | 6/2010 | Sugimoto |
| 7,920,205 B2 | 4/2011 | Awazu |

(Continued)

FOREIGN PATENT DOCUMENTS

| | | |
|---|---|---|
| CN | 101213831 A | 7/2008 |
| CN | 101917795 A | 12/2010 |

(Continued)

OTHER PUBLICATIONS

"U.S. Appl. No. 15/773,356, Corrected Notice of Allowability dated Jan. 16, 2020", 2 pgs.

(Continued)

*Primary Examiner* — Jeffery A Williams
(74) *Attorney, Agent, or Firm* — Schwegman Lundberg & Woessner, P.A.

(57) ABSTRACT

A method includes capturing a first image of a scene, detecting a face in a section of the scene from the first image, and activating an infrared (IR) light source to selectively illuminate the section of the scene with IR light. The IR light source includes an array of IR light emitting diodes (LEDs). The method includes capturing a second image of the scene under selective IR lighting from the IR light source, detecting the face in the second image, and identifying a person based on the face in the second image.

20 Claims, 12 Drawing Sheets

Related U.S. Application Data continuation-in-part of application No. PCT/EP2016/076360, filed on Nov. 2, 2016.

(60) Provisional application No. 62/253,580, filed on Nov. 10, 2015.

(51) Int. Cl.
<table>
<tr><td>G03B 15/05</td><td>(2006.01)</td></tr>
<tr><td>G06K 9/20</td><td>(2006.01)</td></tr>
<tr><td>G06K 9/00</td><td>(2006.01)</td></tr>
<tr><td>H04N 5/33</td><td>(2006.01)</td></tr>
<tr><td>G06T 7/586</td><td>(2017.01)</td></tr>
<tr><td>H04N 5/232</td><td>(2006.01)</td></tr>
</table>

(52) U.S. Cl.
CPC ..... *G06K 9/00255* (2013.01); *G06K 9/00288* (2013.01); *G06K 9/00664* (2013.01); *G06K 9/209* (2013.01); *G06K 9/2027* (2013.01); *G06T 7/586* (2017.01); *H04N 5/2256* (2013.01); *H04N 5/2351* (2013.01); *H04N 5/33* (2013.01); *G03B 2215/0567* (2013.01); *H04N 5/23296* (2013.01)

(56) References Cited

U.S. PATENT DOCUMENTS

<table>
<tr><td>8,761,594</td><td>B1</td><td>6/2014</td><td>Gross et al.</td></tr>
<tr><td>8,890,946</td><td>B2</td><td>11/2014</td><td>Publicover et al.</td></tr>
<tr><td>9,491,370</td><td>B2</td><td>11/2016</td><td>Yeo et al.</td></tr>
<tr><td>10,484,616</td><td>B2</td><td>11/2019</td><td>Van der Sijde et al.</td></tr>
<tr><td>2008/0212849</td><td>A1</td><td>9/2008</td><td>Gao et al.</td></tr>
<tr><td>2009/0124376</td><td>A1</td><td>5/2009</td><td>Kelly et al.</td></tr>
<tr><td>2011/0135152</td><td>A1</td><td>6/2011</td><td>Kashiwagi</td></tr>
<tr><td>2012/0141104</td><td>A1</td><td>6/2012</td><td>Deluca</td></tr>
<tr><td>2013/0251215</td><td>A1</td><td>9/2013</td><td>Coons</td></tr>
<tr><td>2014/0300779</td><td>A1</td><td>10/2014</td><td>Yeo et al.</td></tr>
<tr><td>2014/0306622</td><td>A1</td><td>10/2014</td><td>Van De Roer et al.</td></tr>
<tr><td>2016/0182788</td><td>A1</td><td>6/2016</td><td>Wan et al.</td></tr>
<tr><td>2016/0337564</td><td>A1</td><td>11/2016</td><td>Fournier et al.</td></tr>
<tr><td>2016/0344910</td><td>A1</td><td>11/2016</td><td>Shen</td></tr>
<tr><td>2017/0249501</td><td>A1</td><td>8/2017</td><td>Van Der Sijde et al.</td></tr>
<tr><td>2018/0324343</td><td>A1</td><td>11/2018</td><td>Van Der Sijde et al.</td></tr>
</table>

FOREIGN PATENT DOCUMENTS

<table>
<tr><td>CN</td><td>102006346 A</td><td>4/2011</td></tr>
<tr><td>CN</td><td>201788518 U</td><td>4/2011</td></tr>
<tr><td>CN</td><td>102143342 A</td><td>8/2011</td></tr>
<tr><td>CN</td><td>102918834 A</td><td>2/2013</td></tr>
<tr><td>CN</td><td>103077370 A</td><td>5/2013</td></tr>
<tr><td>CN</td><td>103959089 A</td><td>7/2014</td></tr>
<tr><td>CN</td><td>104145276 A</td><td>11/2014</td></tr>
<tr><td>CN</td><td>104580886 A</td><td>4/2015</td></tr>
<tr><td>CN</td><td>106489265 A</td><td>3/2017</td></tr>
<tr><td>CN</td><td>106574964 A</td><td>4/2017</td></tr>
<tr><td>EP</td><td>1818855 A2</td><td>8/2007</td></tr>
<tr><td>EP</td><td>1818855 A3</td><td>1/2008</td></tr>
<tr><td>EP</td><td>2128693 A1</td><td>12/2009</td></tr>
<tr><td>EP</td><td>3401841 A1</td><td>11/2018</td></tr>
<tr><td>JP</td><td>2005-338280 A</td><td>12/2005</td></tr>
<tr><td>JP</td><td>2006-340000 A</td><td>12/2006</td></tr>
<tr><td>JP</td><td>2009-204734 A</td><td>9/2009</td></tr>
<tr><td>JP</td><td>2014-219602 A</td><td>11/2014</td></tr>
<tr><td>JP</td><td>2015-034850 A</td><td>2/2015</td></tr>
<tr><td>JP</td><td>2018-191293 A</td><td>11/2018</td></tr>
<tr><td>KR</td><td>20180084865 A</td><td>7/2018</td></tr>
</table>

OTHER PUBLICATIONS

"U.S. Appl. No. 15/773,356, Notice of Allowance dated Nov. 14, 2019", 8 pgs.

"U.S. Appl. No. 15/773,356, Response filed Oct. 10, 2019 to Non-Final Office Action dated Jul. 12, 2019", 14 pgs.

"European Application Serial No. 16795254.8, Office Action dated May 15, 2019", 7 pgs.

"European Application Serial No. 16795254.8, Response filed Aug. 20, 2019 to Office Action dated May 15, 2019", 45 pgs.

"European Application Serial No. 16795254.8, Summons mailed Feb. 7, 2020", 7 pgs.

"International Application Serial No. PCT/EP2016/076360, International Preliminary Report on Patentability dated May 24, 2018", 9 pgs.

"U.S. Appl. No. 15/591,040, Corrected Notice of Allowability dated Sep. 4, 2019", 2 pgs.

"U.S. Appl. No. 15/591,040, Final Office Action dated May 2, 2019", 14 pgs.

"U.S. Appl. No. 15/591,040, Non Final Office Action dated Oct. 5, 2018", 15 pgs.

"U.S. Appl. No. 15/591,040, Notice of Allowance dated Jul. 25, 2019", 8 pgs.

"U.S. Appl. No. 15/591,040, Response filed Jan. 7, 2019 to Non Final Office Action dated Oct. 5, 2018", 17 pgs.

"U.S. Appl. No. 15/591,040, Response filed Jul. 2, 2019 to Final Office Action dated May 2, 2019", 12 pgs.

"U.S. Appl. No. 15/591,040, Supplemental Response filed Jul. 11, 2019 to Final Office Action dated May 2, 2019", 10 pgs.

"U.S. Appl. No. 15/773,356, Non Final Office Action dated Jul. 12, 2019", 14 pgs.

"U.S. Appl. No. 15/773,356, Preliminary Amendment filed May 3, 2018", 8 pgs.

"European Application Serial No. 16158004.8, Extended European Search Report dated Sep. 19, 2016", 7 pgs.

"International Application Serial No. PCT/EP2016/076360, International Search Report dated Jan. 19, 2017", 3 pgs.

"International Application Serial No. PCT/EP2016/076360, Written Opinion dated Jan. 19, 2017", 7 pgs.

"Chinese Application Serial No. 201680065786, First Office Action dated Apr. 26, 2020", (w/English Translation), 10 pgs.

"Chinese Application Serial No. 201680065786, Response filed Sep. 11, 20 to First Office Action dated Apr. 26, 2020", (w/ English Translation), 23 pgs.

U.S. Appl. No. 16/790,433, filed Feb. 13, 2020, Adaptive Light Source.

"Chinese Application Serial No. 201810437851.0, Office Action dated Nov. 26, 2020", (w/ English Translation), 26 pgs.

"Chinese Application Serial No. 201680065786.2, Office Action dated Jan. 15, 2021", (w/ English Translation), 12 pgs.

"European Application Serial No. 16795254.8, EPO Written Decision to Refuse dated Nov. 24, 2020", 8 pgs.

"European Application Serial No. 18170075.8, Response filed Apr. 5, 2019 to Office Action dated Nov. 19, 2018", 56 pgs.

"Japanese Application Serial No. 2018-523008, Notification of Reasons for Refusal dated Jan. 5, 2021", (w/ English Translation'!, 11 pgs.

"European Application Serial No. 18170075.8, Response filed Apr. 15, 2019 to Office Action dated Nov. 19, 2018", 5 6 pgs.

"European Application Serial No. 18170075.8, Office Action dated Nov. 19, 2018", 2 pgs.

"European Application Serial No. 18170075.8, European Search Report dated Sep. 19, 2018", 9 pgs.

"Chinese Application Serial No. 201680065786.2, Response filed Mar. 30, 2021 to Office Action dated Jan. 15, 2021", (w/ English Translation of Claims), 12 pgs.

"Chinese Application Serial No. 20181043851.0, Response filed Mar. 15, 2021 to Office Action dated Nov. 26, 2020", (w/ English Translation), 12 pgs.

"Japanese Application Serial No. 2018-523008, Written Argument and Amendment filed Mar. 12, 2021 in response to Notification of Reasons for Refusal dated Jan. 5, 2021", (w/ English Translation), 13 pgs.

"U.S. Appl. No. 16/790,433, Non Final Office Action dated Mar. 15, 2021", 20 pgs.

"European Application Serial No. 16795254,8, Communication Pursuant to Article 94(3) EPC dated May 15, 2019", 7 pgs.

(56) References Cited

OTHER PUBLICATIONS

"European Application Serial No. 18170075.8, Extended European Search Report dated Sep. 19, 2018", 9 pgs.
"U.S. Appl. No. 16/790,433, Response filed Jun. 14, 21 to Non-Final Office Action dated Mar. 15, 2021", 13 pgs.
"Chinese Application Serial No. 20181043851.0, Office Action dated May 21, 2021", (w/ English Translation), 14 pgs.
"U.S. Appl. No. 16/790,433, Final Office Action dated Jul. 7, 2021", 14 pgs.
"Korean Application Serial No. 10-2018-0053076, Voluntary Amendment filed May 10, 2021", (w/ English Translation of Claims), 21 pgs.

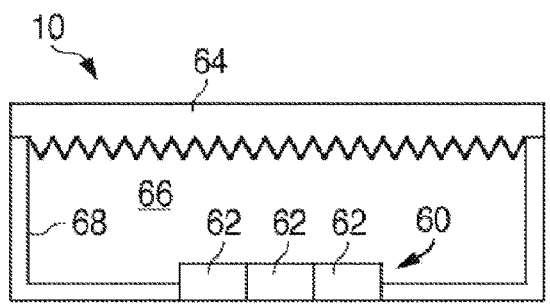
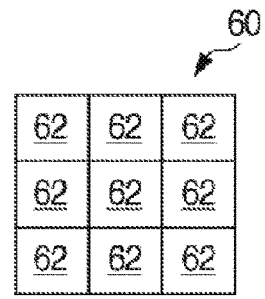
FIG. 6  FIG. 7
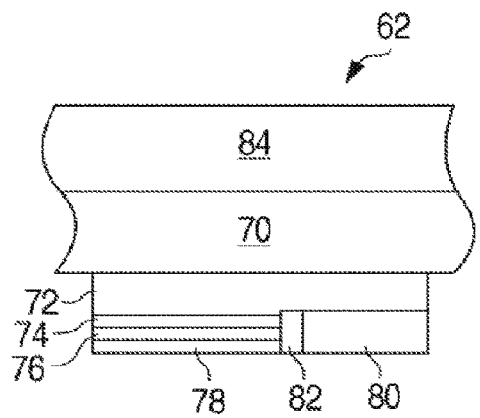
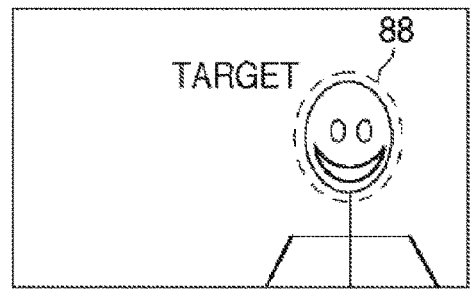
FIG. 8  FIG. 9
FIG. 10A
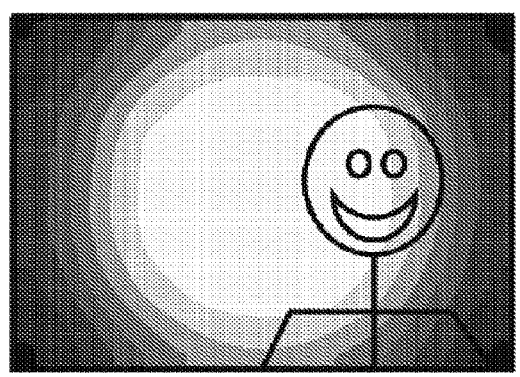
FIG. 10B
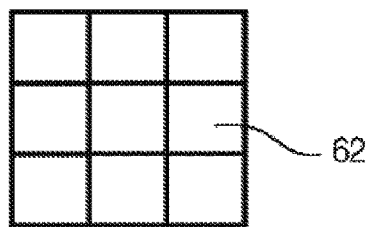

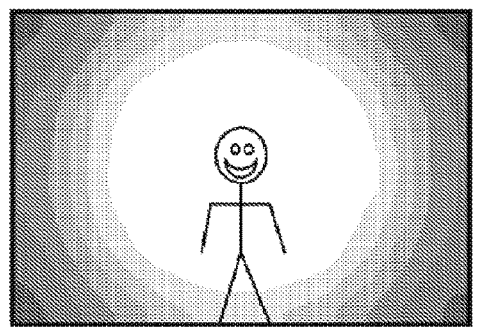
FIG. 18A
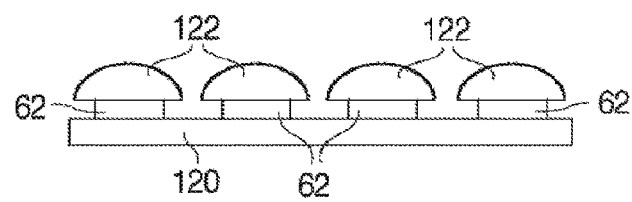
FIG. 18B
FIG. 19
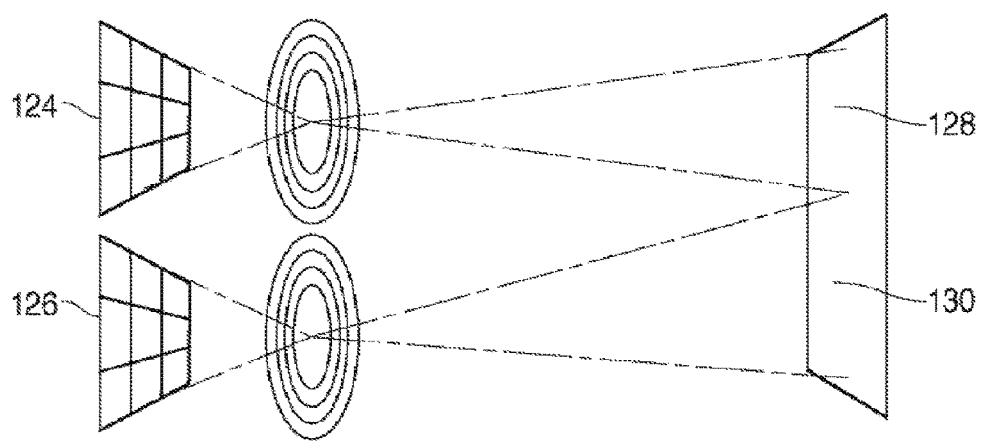
FIG. 20

ADAPTIVE LIGHT SOURCE

CROSS-REFERENCE TO RELATED APPLICATIONS

The present application is a continuation of U.S. application Ser. No. 15/591,040, filed May 9, 2017, which is a continuation-in-part of International Application No. PCT/EP2016/076360, filed Nov. 2, 2016, which claims priority to U.S. Provisional Patent Application No. 62/253,580, filed Nov. 10, 2015 and European Patent Application No. 16158004.8, filed Mar. 1, 2016. U.S. application Ser. No. 15/591,040, International Application No. PCT/EP2016/076360, U.S. Provisional Patent Application No. 62/253,580, and European Patent Application No. 16158004.8 are incorporated herein.

BACKGROUND

Semiconductor light-emitting devices including light emitting diodes (LEDs), resonant cavity light emitting diodes (RCLEDs), vertical cavity laser diodes (VCSELs), and edge emitting lasers are among the most efficient light sources currently available. Material systems currently of interest for manufacturing of high-brightness light emitting devices capable of operation across the visible spectrum include Group III-V semiconductors, particularly binary, ternary, and quaternary alloys of gallium, aluminum, indium, and nitrogen, also referred to as III-nitride materials. Typically, III-nitride light emitting devices are fabricated by epitaxially growing a stack of semiconductor layers of different compositions and dopant concentrations on a sapphire, silicon carbide, III-nitride, or other suitable substrate by metal-organic chemical vapor deposition (MOCVD), molecular beam epitaxy (MBE), or other epitaxial techniques. The stack often includes one or more n-type layers doped with, for example, Si, formed over the substrate, one or more light emitting layers in an active region formed over the n-type layer or layers, and one or more p-type layers doped with, for example, Mg, formed over the active region. Electrical contacts are formed on the n- and p-type regions.

Due to their compact size and low power requirements, semiconductor light-emitting devices are attractive candidates for light sources such as camera flashes for hand-held, battery-powered devices, such as cameras and cell phones.

SUMMARY

In examples of the present disclosure, a method includes capturing a first image of a scene, detecting a face in a section of the scene from the first image, and activating an infrared (IR) light source to selectively illuminate the section of the scene with IR light. The IR light source includes an array of IR light emitting diodes (LEDs). The method includes capturing a second image of the scene under selective IR lighting from the IR light source, detecting the face in the second image, and identifying a person based on the face in the second image.

BRIEF DESCRIPTION OF THE DRAWINGS

FIG. 6 is a cross sectional view of one example of a light source.

FIG. 7 is a top view of an array of LEDs.

FIG. 8 is a cross sectional view of one LED in the array of FIG. 7.

FIG. 9 illustrates the scene that is illuminated in the examples in the following figures.

FIGS. 10A, 11A, 12A, 13A, 14A, and 15A illustrate different illuminance profiles for the scene illustrated in FIG. 9.

FIGS. 10B, 11B, 12B, 13B, 14B, and 15B illustrate the amount of current applied to the LEDs in the array of FIG. 7 to generate the illuminance profiles illustrated in FIGS. 10A, 1A, 12A, 13A, 14A, and 15A.

FIGS. 18A and 18B illustrate the amount of current applied to the LEDs in the array of FIG. 7 to generate an illuminance profile for a wide-angle application.

FIG. 19 is a cross sectional view of an array of LEDs with individual optics.

FIG. 20 illustrates a light source with multiple LED arrays.

DETAILED DESCRIPTION

Though in the description below, embodiments of the invention are described as camera flashes but other uses are contemplated and are within the scope of the invention.

One problem with all camera flashes is that objects close to the camera are often overexposed while objects further from the camera do not get enough light. Embodiments of the invention include a light source such as a camera flash, for example for a portable or battery-powered device, or for a larger non-battery-powered photo studio flash. Light sources according to embodiments of the invention may adapt their illuminance profiles to the scene and deliver the right amount of light to all objects on the scene. The adaptive lighting system according to embodiments of the invention may include a semiconductor light source such as a semiconductor light-emitting device, thought any suitable light may be used.

Figure 1A:
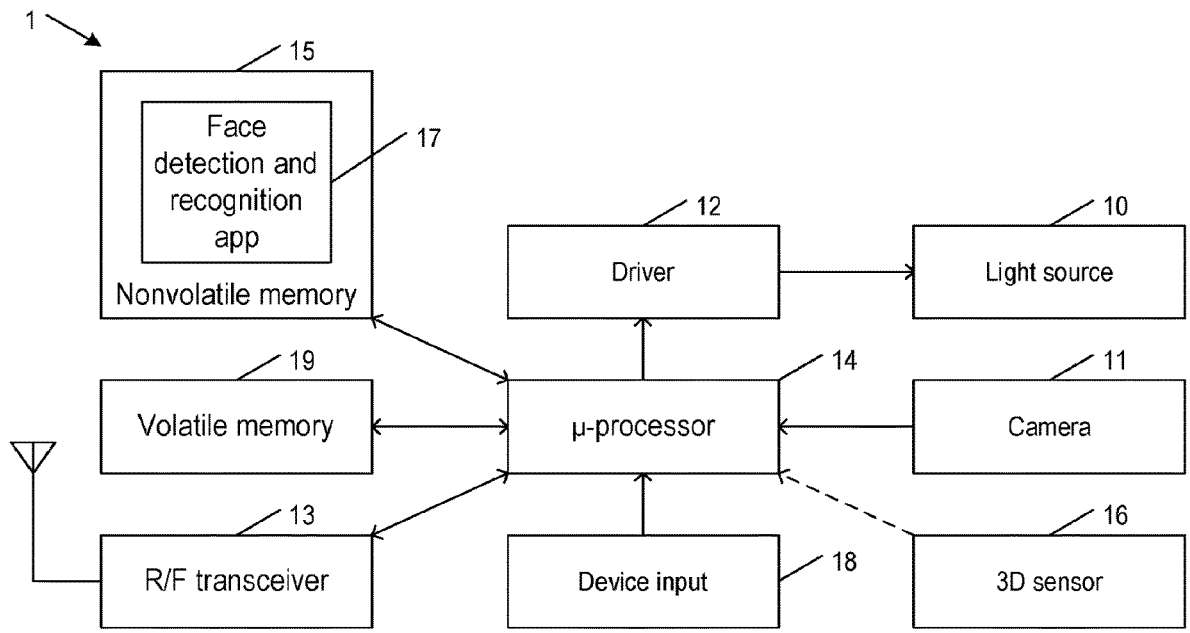
FIG. 1A is a block diagram illustrating a system including at least one semiconductor light-emitting device as a light source.

FIG. 1A illustrates an example of an adaptive lighting system 1 according to embodiments of the invention. System 1 may be a smart phone, a tablet computer, a laptop computer, a desktop computer, a computer monitor, a digital camera, or any suitable device. System 1 may also be a camera module for any suitable device. System 1 includes a light source 10 connected to a driver 12. Driver 12 supplies power to light source 10, as described below. Light source 10 may be one or more arrays of infrared (IR) light emitting diodes (LEDs). Driver 12 is connected to a microprocessor 14. Microprocessor 14 may include an application processor and a baseband processor, which may be connected to a radio frequency (RF) transceiver 13 to make and receive calls. A nonvolatile memory 15 stores applications, such as a face detection and recognition application 17, which microprocessor 14 loads to volatile memory 19 for execution. Microprocessor 14 receives input from an input device 18 and a camera 11. System 1 may also include a 3D sensor 16. Input device 18 may be, for example, a user-activated input device such as a button that a user presses to take a picture. Input device 18 may not require a user input in some embodiments, such as in the case where a picture is taken automatically. Input device 18 may be omitted in some embodiments.

3D sensor 16 may be any suitable sensor capable of making a 3D profile of the scene, prior to taking a picture. In some embodiments, 3D sensor 16 may be a time of flight (ToF) camera. A ToF camera measures the time it takes for light reflected from objects to travel back to the ToF camera. The time may be used to calculate the distance to each object in the scene. In some embodiments, 3D sensor 16 may be a structured light sensor. A structured light sensor includes a projection device that projects a specially designed pattern of light on the scene. A camera also included in the structured light sensor measures the position of each part of the light pattern reflected from the objects of the scene and determines the distance to these objects by triangulation. In some embodiments, 3D sensor 16 may be an auxiliary camera or cameras positioned at a distance from each other in the body of the device. By comparing the position of the objects as seen by the auxiliary cameras, distances to each object can be determined by triangulation. In some embodiments, 3D sensor 16 is the autofocus signal of the main camera in the device. While scanning the focus position of the camera lens, the system can detect at which positions which parts of the scene are in focus. A 3D profile of the scene is then built by translating the corresponding lens positions into the distances to the objects that are in focus for these positions. A suitable autofocus signal is derived by conventional methods, for example by measuring the contrast or by utilizing phase detection sensors within the camera sensor. When phase detection sensors are used, in some embodiments, for optimal functioning of the adaptive flash, the positions of individual phase detection sensors may correspond to areas illuminated by separate segments of the light source 10, as described below.

Figure 1B:
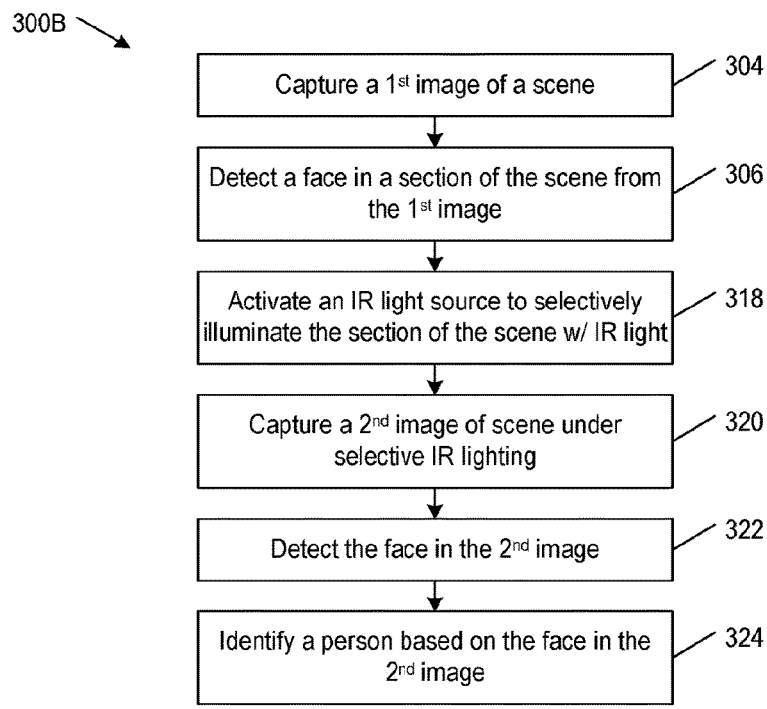
FIGS. 1B, 1C, 2A, 2B, and 2C illustrate methods of illuminating a scene using, for example, the system of FIG. 1A.

FIG. 1B is a flowchart of a method 300B for using system 1 (FIG. 1A) in some embodiments of the present disclosure. Method 300B may be implemented by microprocessor 14 loading the instructions of application 17 from nonvolatile memory 15 to volatile memory 19 and then executing the instructions. Method 300B, and any method described herein, may include one or more operations, functions, or actions illustrated by one or more blocks. Although the blocks are illustrated in sequential orders, these blocks may also be performed in parallel, and/or in a different order than those described herein. Also, the various blocks may be combined into fewer blocks, divided into additional blocks, and/or eliminated based upon the desired implementation. Method 300B may begin in block 304.

In block 304, microprocessor 14 causes camera 11 to capture a first image of a scene (corresponding to the camera's field of view). Block 304 may be followed by block 306.

In block 306, microprocessor 14 detects a face in a section of the scene from the first image. Microprocessor 14 may use a face detection algorithm, such as the face detector in the Open Source Computer Vision (OpenCV) library, to locate the face in the scene. Block 306 may be followed by block 318.

In block 318, microprocessor 14 activates light source 10 to selectively illuminate the section of the scene with IR light. For example, microprocessor 14 selects a group of the IR LEDs in light source 10 based on the location of the face in the scene (the section of the scene), and causes driver 12 to only drive the selected IR LEDs. Block 318 may be followed by block 320.

In block 320, microprocessor 14 causes camera 11 to capture a second image of the scene under the selective IR lighting generated in block 318. Block 320 may be followed by block 322.

In block 322, microprocessor 14 detects the face in the second image. The face in the second image may have optimal exposure. Block 322 may be followed by block 324.

In block 324, microprocessor 14 identifies or verifies a person based on the face in the second image. Microprocessor 14 may use a face recognition algorithm, such as the face recognizer in the OpenCV library, to identify or verify the person based on the face in the second image. Method 300B may end in block 324.

Figure 1C:
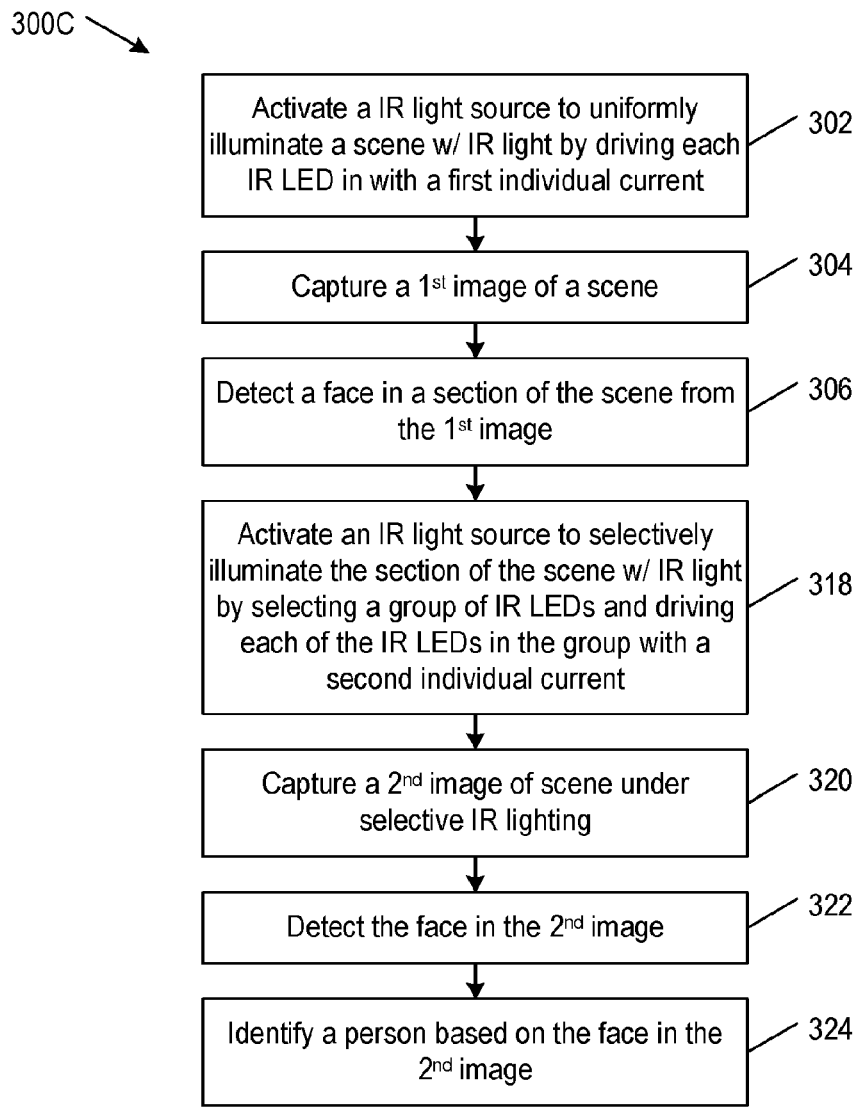

FIG. 1C is a flowchart of a method 300C for using system 1 (FIG. 1A) in some embodiments of the present disclosure. Method 300B may be a variation of method 300B (FIG. 1B). Method 300B may begin in block 302.

In block 302, microprocessor 14 activates light source 10 to uniformly illuminate a scene with IR light. For example, microprocessor 14 causes driver 12 to drive each of the IR LEDs in light source 10 with a first individual current. Block 302 may be followed by block 304.

In block 304, microprocessor 14 causes camera 11 to capture a first image of the scene (corresponding to the camera's field of view). Block 304 may be followed by block 306.

In block 306, microprocessor 14 detects a face in a section of the scene from the first image. Block 306 may be followed by block 318.

In block 318, microprocessor 14 activates light source 10 to selectively illuminate the section of the scene with IR light. For example, microprocessor 14 selects a group of the IR LEDs in light source 10 based on the location of the face in the scene (the section of the scene), and causes driver 12 to drive each of the selected IR LEDs with a second individual current. The second individual current may be greater than the first individual current, and the total of the second individual currents ("second total current") used to drive light source 10 may be equal to the total of the first individual currents ("first total current") used to drive light source 10. Alternatively, the second individual current may be less than the first individual current, and the second total current may be less than the first total current. Block 318 may be followed by block 320.

In block 320, microprocessor 14 causes camera 11 to capture a second image of the scene under the selective IR lighting generated in block 318. Block 320 may be followed by block 322.

In block 322, microprocessor 14 detects the face in the second image. The face in the second image may have optimum exposure. For example, when the face in the scene is underexposed in the first image, the face in the second image is illuminated with more IR light from the selected IR LEDs aimed toward the face and driven with higher currents without increasing the total current usage. In another example, when the face in the scene is overexposed in the first image, the face in the second image is illuminated with less IR light from the selected IR LEDs aimed toward the face and driven with less currents while decreasing the total current usage. Block 322 may be followed by block 324.

In block 324, microprocessor 14 identifies or verifies a person based on the face in the second image. Method 300C may end in block 324.

Figure 2A:
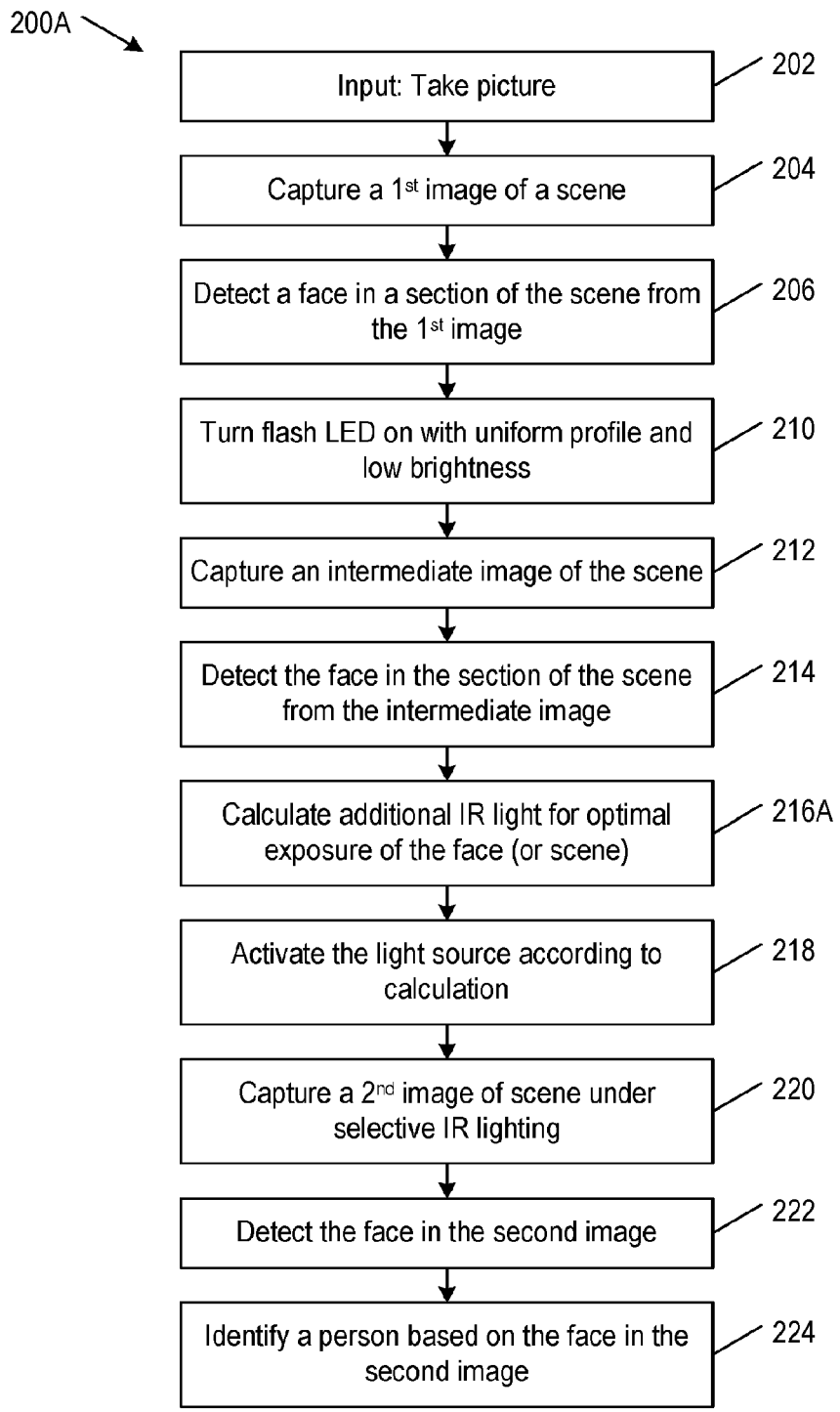

FIG. 2A is a flowchart of a method 200A for using system 1 (FIG. 1A) in some embodiments of the present disclosure. Method 200A may be a variation of method 300B (FIG. 1B). Method 200A may begin in block 202.

In block 202 an input is generated, for example instructing that a picture be taken. In block 204 camera 11 takes a first image of the scene (corresponding to the camera's field of view) with flash (light source 10) turned off. In block 206 a face is detected in a section of the scene from the first image. In block 210 light source 10 is turned on in low light output mode (typically called "torch mode"). At this time the illuminance profile of the light source 10 is kept uniform where "uniform" means all portions of the scene are illuminated with a known illumination profile. In block 212 an intermediate image is captured while light source 10 continues to be on with uniform illuminance profile and low brightness. In block 214 the face is detected in the section of the image from the intermediate image. In block 216A the system (e.g., microprocessor 14) calculates the optimum brightness for all parts of the face (or the overall scene) to achieve optimal exposure. This can be done by subtracting the pixel brightness values of the face (or the scene) in first image from the respective pixel brightness values of the face (or the scene) in the second image, and scaling the differences to achieve the optimal exposure levels. In block 218 light source 10 are activated according to the illuminance profile calculated in block 216A. In block 220, a second image is taken by camera 11 while light source 10 is activated according to the illuminance profile calculated in block 216A. In block 222 the face is detected in the second image. In block 224 a person is identified or verified based on the face in the second image.

Figure 2B:
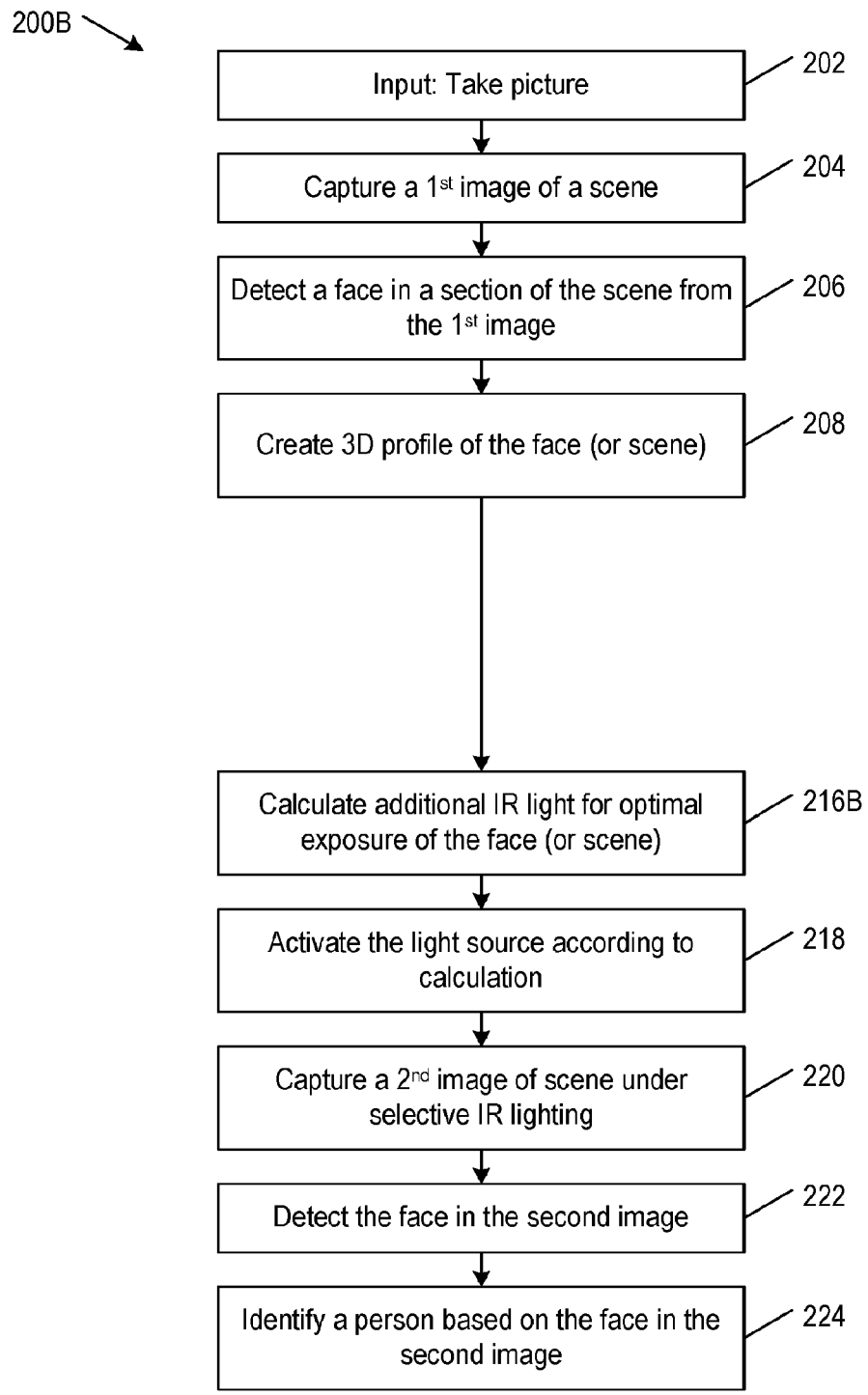

FIG. 2B is a flowchart of a method 200B for using system 1 (FIG. 1A) in some embodiments of the present disclosure. Method 200B may be a variation of method 300B (FIG. 1B). Method 200B may begin in block 202.

In block 202, an input is generated, for example instructing that a picture be taken. In block 204 camera 11 takes a first image of the scene (corresponding to the camera's field of view) with flash (light source 10) turned off. In block 206 a face is detected in a section of the scene from the first image. In block 208, a 3D profile of the face (or the overall scene) is generated. For example, 3D sensor 16 may generate the 3D profile of the face (or scene), or 3D sensor 16 may sense data about the face (or the scene) and transmit the data to microprocessor 14, which may generate the 3D profile of the face (or the scene). In block 216B the system (e.g., microprocessor 14) calculates the optimum brightness for all parts of the face (or the scene) to achieve optimal exposure based on the 3D profile. For example, microprocessor may decide to provide additional IR lighting to parts of the face (or the scene) farther from camera 11. In block 218, based on the calculation performed in block 216B, the scene is illuminated by light source 10. In block 220, a second image is taken by camera 11 while light source 10 is activated according to the illuminance profile calculated in block 216A. In block 222 the face is detected in the second image. In block 224 a person is identified or verified based on the face in the second image.

Figure 2C:
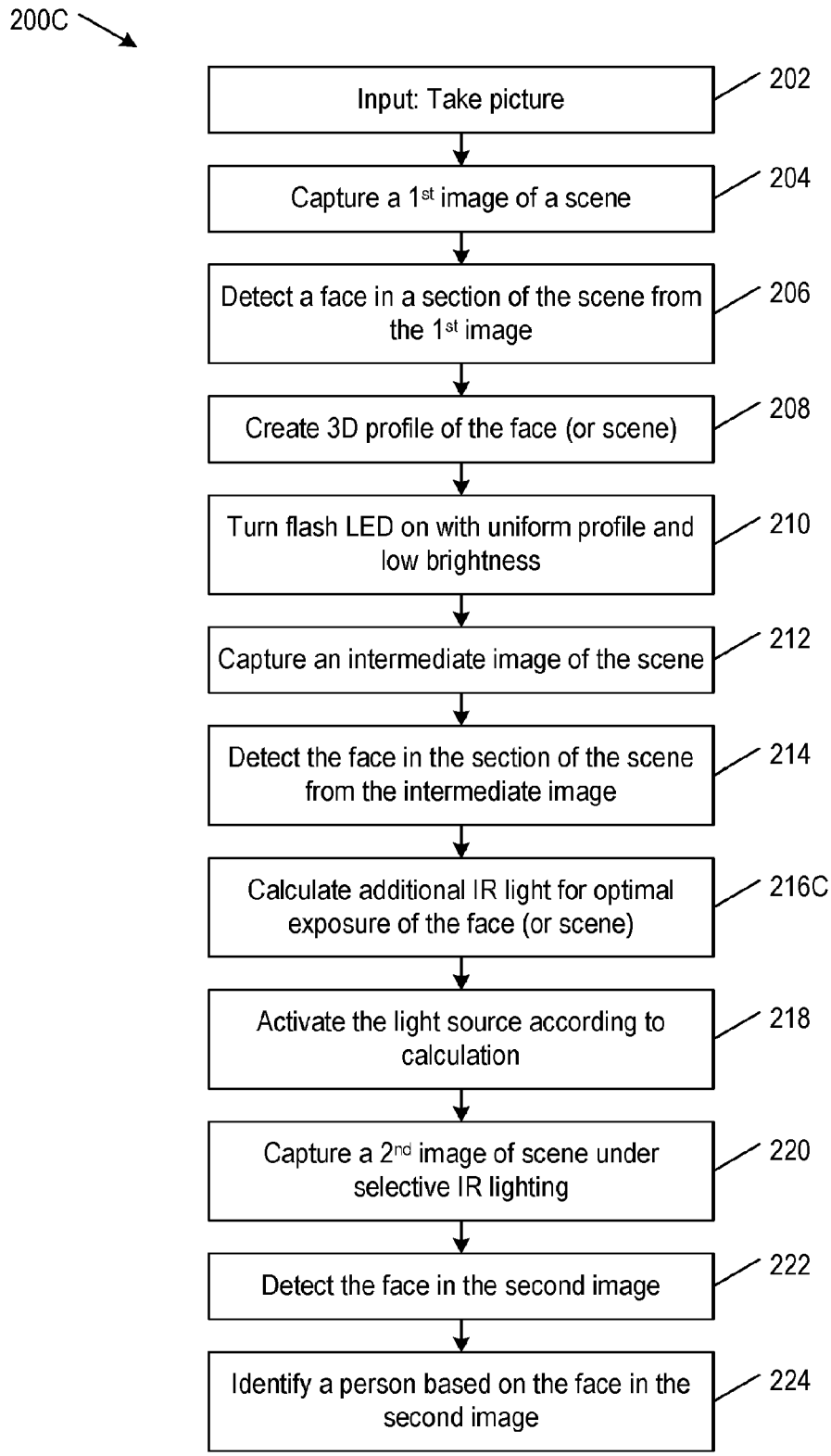

FIG. 2C is a flowchart of a method 200C for using system 1 (FIG. 1A) in some embodiments of the present disclosure. Method 200C may be a variation of method 300B (FIG. 1B). Method 200C may begin in block 202.

In block 202 an input is generated, for example instructing that a picture be taken. In block 204 camera 11 takes a first image of the scene (corresponding to the camera's field of view) with flash (light source 10) turned off. In block 206 a face is detected in a section of the scene from the first image. In block 208, a 3D profile of the face (or the overall scene) is generated. In block 210, light source 10 is turned on in low light output mode (typically called "torch mode"). At this time the illuminance profile of light source 10 is kept uniform where "uniform" means all portions of the scenes are illuminated. In block 212 an intermediate image is captured with light source 10 in torch mode. In block 214 the face is detected in the section of the image from the intermediate image. In block 216C the system (e.g., microprocessor 14) calculates the optimum brightness for all parts of the face (or the scene) to achieve optimal exposure based on the input of the first image and the intermediate image taken and the 3D profile as described above in the text accompanying FIG. 2A and FIG. 2B. In block 218, based on the calculation performed in block 216B, the scene is illuminated by light source 10. In block 220, a second image is taken by camera 11 while light source 10 is activated according to the illuminance profile calculated in block 216A. In block 222 the face is detected in the second image. In block 224 a person is identified or verified based on the face in the second image.

Figure 3:
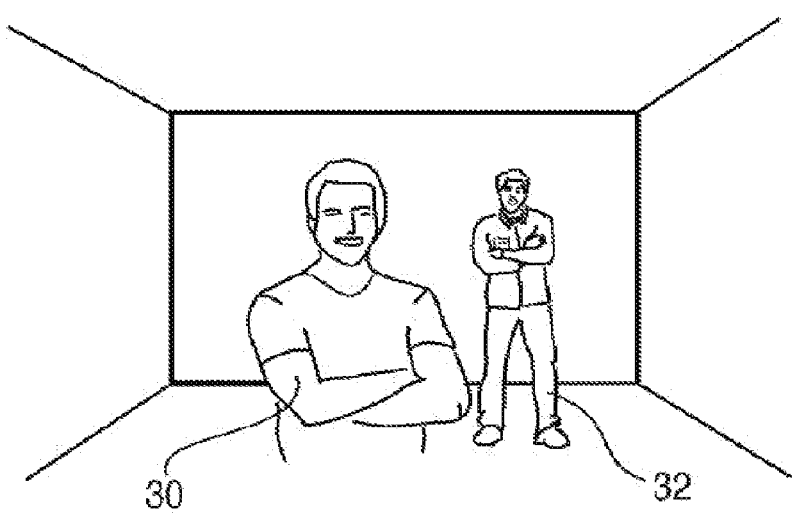
FIG. 3 illustrates a scene to be illuminated.

In each of FIGS. 2A, 2B, and 2C, the input may be, for example, a user input such as the user pushing a button, an input generated by microprocessor 14 (for example, if microprocessor 14 is programmed to take a picture at a predetermined time, or at a predetermined interval), or any other suitable input. FIG. 3 illustrates a scene to be captured in a picture when the input is generated. The scene illustrated in FIG. 3 includes a first person 30 in the foreground, and a second person 32 in the background. This scene is selected for illustration purposes only. Other scenes with multiple objects or persons at various distances from the camera are also suitable for use of the present invention.

Figure 4:
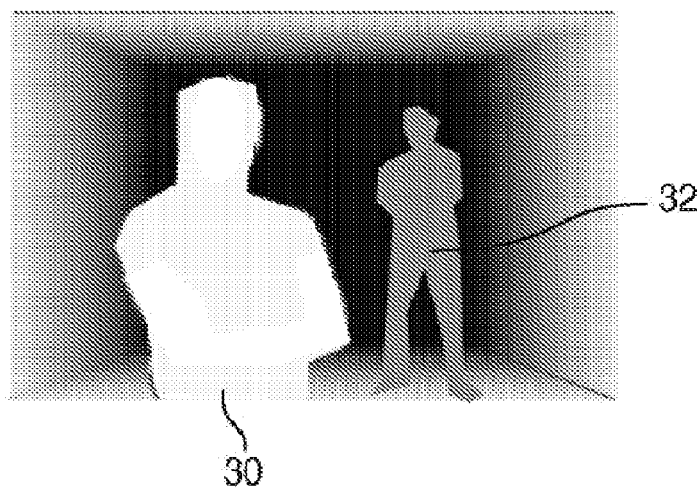
FIG. 4 illustrates a three dimensional (3D) map of the scene illustrated in FIG. 3.

FIG. 4 illustrates the 3D profile for the scene illustrated in FIG. 3. In FIG. 4, the lighter shades correspond to shorter distance from the camera, darker shades correspond to larger distance from the camera. Accordingly, the person 30 in the foreground has the lightest shading, indicating the person 30 is closest to the camera. The person 32 in the background has darker shading, indicating the person 32 is further from the camera. The background is black, indicating the furthest distance from the camera.

Objects located far from the flash may receive higher light intensity; objects located closer to the flash may receive less light. As is well-known, illuminance of light decreases according to the inverse square law of distance (illuminance~$1/distance^2$). With the 3D profile of the scene the required amount of light to distribute to which portions of the scene can therefore be calculated. The algorithm calculating the required intensity profile may also take into account the illuminance that each of the objects in the scene receives from ambient light, information gathered with the capture of a first image, and may adjust the amount of flash light accordingly. For example, objects 30 that are already well-illuminated, for example because they are lightly colored or reflective, may receive less light; objects 32 that are not well-illuminated, for example because they are dark or not reflective, may receive more light than may be calculated solely based on their distance from the light source, as determined by the 3D profile.

Digital cameras and their image processors typically include face recognition algorithms. In some embodiments, information from a face recognition algorithm may be used to better illuminate faces compared to other objects. If there is not enough light to expose the complete picture well, faces benefit from more light. If the person is too close and there is a danger of overexposure, this feature should be turned off, such that more light is not directed to the face. In some embodiments, the calculation of relative light from the 3D profile may reduce the amount of light sent towards the eyes of the person to minimize "red eye" in the picture.

In some embodiments, the calculation of relative light from the 3D profile may identify parts of the scene (e.g., faces in the background) that are very far from the flash and cannot be properly illuminated. A minimal amount of light is sent to these parts of the scene, in order to maximize the amount of light sent towards the useful parts of the scene (e.g., faces in the foreground) and thus provide better use of available drive current capability.

In some embodiments, a user interface (for example, the touch screen on a smart phone) may allow a user control over the relative amount of light sent to each portion of the scene. For example, the user may turn adaptive features of the flash on and off, may turn various parts of the algorithm used to calculate the relative light from the 3D profile (described above) on and off, and may manually create flash accents on the scene.

Several illumination modes are contemplated by embodiments of the invention.

In some embodiments, in a first group of illumination modes, illumination from light source 10 is distributed across the scene to achieve the most homogenously useful illuminated picture. In particular, in some embodiments, overexposure is minimized: in the case where foreground is well illuminated by ambient light, all light from light source 10 is directed to the background. In some embodiments, light source 10 acts as a fill in flash: in the case where the background is well illuminated by ambient light, all light from light source 10 is directed to foreground. In some embodiments, when the foreground and the background are evenly illuminated by ambient lighting, light from light source 10 may be send mostly to the background. In some embodiments, in the case of a dark foreground, light from light source 10 illuminates the foreground just enough for a good picture, and the rest of the light from light source 10 is sent to the background.

In some embodiments, in a second group of illumination modes, selected objects are illuminated. In particular, in some embodiments, in combination with face recognition, faces may be weighted highest for best illumination. In some embodiments, in combination with face recognition, background around faces (or other objects) may receive less light, for example to increase contrast between the illuminated face and the background nearest the face. In some embodiments, selected zones of the scene are identified for example by a user input. Light from light source 10 may be directed only within the selected zone. Examples of selected zones include zoomed-in images, or otherwise-identified portions of the scene. In some embodiments, for pictures of, for example, business cards, light from light source 10 may be emitted with a very high uniformity level.

Figure 5:
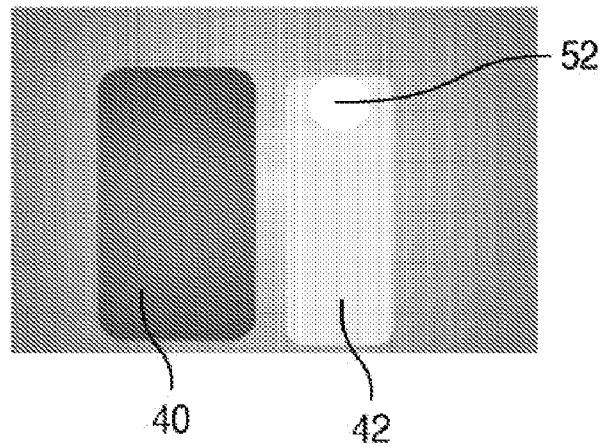
FIG. 5 illustrates a flash intensity profile for the scene illustrated in FIG. 3.

FIG. 5 illustrates light provided to the scene of FIG. 3 based on the calculation illustrated in FIG. 4. In FIG. 5, lighter shading corresponds to more light from light source 10, and darker shading corresponds to less light from light source 10. As illustrated in FIG. 5, more light is provided in region 42, corresponding to the background person 32, while less light is provided in region 40, corresponding to foreground person 30. Extra light is provided to the face 52 of the person in the background. The least amount of light may be provided to the background where neither person 30 nor person 32 appears (not shown).

FIGS. 6, 7, and 8 illustrate one example of a light source 10, which may be used in system 1 illustrated in FIG. 1A. Any suitable light source may be used and embodiments of the invention are not limited to the structures illustrated in FIGS. 6, 7, and 8.

FIG. 7 is a top view of a square array 60 of LEDs 62. LEDs 62 may be white LEDs, IR LEDs, or a combination thereof. LEDs 62 may be monolithically grown on a single substrate. Alternatively, LEDs 62 need not be monolithically grown on a single substrate, but may be diced then arranged on a mount such that neighboring LEDs are very close together. In some embodiments, the gap between LEDs 62 is less than ⅓ of a dimension (for example, the width) of an individual LED 62. Though a 3×3 square array is illustrated, any suitable number of LEDs may be used, and the array need not be square, it may be rectangular or any suitable shape. The size of individual LEDs may depend on several design parameters as, for example, building volume with optical lens included, field of view of the camera and number of LEDs in the array. For example, the array must include enough LEDs to illuminate the total field of view of the camera (i.e. the entire scene). For smart phone applications, the total width of the array may be no more than 2 mm in some embodiments.

For larger cameras, the width of the array may be no more than 10 mm in some embodiments. Though the individual LEDs are square, this is not required; rectangular LEDs or LEDs of any suitable shape may be used.

FIG. 6 is a cross sectional view of the light source 10. Array 60 of LEDs 62 is positioned such that a majority of light extracted from array 60 is emitted toward an optic 64. In the example illustrated, optic 64 is spaced apart from array 60. Alternatively, optic 64 may be placed on top of array 60. Optic 64 may be any suitable structure that collimates the light and directs light to the appropriate area of the scene. Optic 64 may be, for example, a lens, multiple lenses, one or more Fresnel lenses, one or more refractive lens, one or more total internal reflection lens elements, one or more reflectors, one or more collimators, or any other suitable optic. In the examples below, optic 64 is a Fresnel lens. Light source 10 may be in the shape of a box 66, with array 60 disposed on a bottom of the box, and optic 64 forming the top of the box. Interior sidewalls 68 of box 66, any portion of the bottom that is not occupied by array 60, and any portion of the top that is not occupied by optic 64, are part of the optical design, and therefore may be reflective or light absorbing as appropriate.

FIG. 8 is a cross sectional view of one example of a single LED 62 in the array illustrated in FIGS. 6 and 7. Any suitable LED may be used and embodiments of the invention are not limited to the structure illustrated in FIG. 8. In the device of FIG. 8, a majority of light is extracted from the LED through the growth substrate. Such a device may be referred to as a flip chip device. The LED of FIG. 8 is formed by growing a III-nitride (e.g., gallium nitride for blue or UV LEDs) or III-arsenide (e.g., gallium arsenide for IR LEDs) semiconductor structure on a growth substrate 70 as is known in the art. Growth substrate 70 is often sapphire but may be any suitable substrate such as, for example, a non-III-nitride material, SiC, Si, GaN, or a composite substrate. A surface of the growth substrate on which the III-nitride or III-arsenide semiconductor structure is grown may be patterned, roughened, or textured before growth, which may improve light extraction from the device. A surface of the growth substrate opposite the growth surface (i.e. the surface through which a majority of light is extracted in a flip chip configuration) may be patterned, roughened or textured before or after growth, which may improve light extraction from the device.

The semiconductor structure includes a light emitting or active region sandwiched between n- and p-type regions. An n-type region 72 may be grown first and may include multiple layers of different compositions and dopant concentration including, for example, preparation layers such as buffer layers or nucleation layers, which may be n-type or not intentionally doped, and n- or even p-type device layers designed for particular optical, material, or electrical properties desirable for the light emitting region to efficiently emit light. A light emitting or active region 74 is grown over n-type region 72. Examples of suitable light emitting regions include a single thick or thin light emitting layer, or a multiple quantum well light emitting region including multiple thin or thick light emitting layers separated by barrier layers. A p-type region 76 may then be grown over light emitting region 74. Like n-type region 72, the p-type region 76 may include multiple layers of different composition, thickness, and dopant concentration, including layers that are not intentionally doped, or n-type layers.

After growth of the semiconductor structure, a reflective p-contact 78 is formed on the surface of p-type region 76. The p-contact 78 often includes multiple conductive layers such as a reflective metal and a guard metal which may prevent or reduce electromigration of the reflective metal. The reflective metal is often silver but any suitable material or materials may be used. After forming p-contact 78, a portion of p-contact 78, p-type region 76, and active region 74 is removed to expose a portion of n-type region 72 on which an n-contact 80 is formed. The n- and p-contacts 80 and 78 are electrically isolated from each other by a gap 82 which may be filled with a dielectric such as an oxide of silicon or any other suitable material. Multiple n-contact vias may be formed; n- and p-contacts 80 and 78 are not limited to the arrangement illustrated in FIG. 8. The n- and p-contacts may be redistributed to form bond pads with a dielectric/metal stack, as is known in the art (not shown).

As described above, LEDs 62 in array 60 may be formed on a single wafer, then diced from the wafer as an array 60 with individual LEDs 62 in the array still attached to a single growth substrate portion. Alternatively, many LEDs 62 may be formed on a single wafer, then diced from the wafer, such that already-diced, individual LEDs are disposed on a mount to form array 60.

Substrate 70 may be thinned after growth of the semiconductor structure or after forming the individual devices. In some embodiments, the substrate is removed from the device of FIG. 8. A majority of light extracted from the device of FIG. 8 is extracted through substrate 70 (or the surface of the semiconductor structure exposed by removing the substrate 70). Embodiments of the invention are not limited to flip chip LEDs—any suitable device may be used.

A wavelength converting structure 84 may be disposed in the path of light extracted from the light emitting device. The wavelength converting structure includes one or more wavelength converting materials which may be, for example, conventional phosphors, organic phosphors, quantum dots, organic semiconductors, II-VI or III-V semiconductors, II-VI or III-V semiconductor quantum dots or nanocrystals, dyes, polymers, or other materials that luminesce. The wavelength converting material absorbs light emitted by the LED and emits light of one or more different wavelengths. Unconverted light emitted by the LED is often part of the final spectrum of light extracted from the structure, though it need not be. The final spectrum of light extracted from the structure may be white, polychromatic, or monochromatic. Examples of common combinations include a blue-emitting LED combined with a yellow-emitting wavelength converting material, a blue-emitting LED combined with green- and red-emitting wavelength converting materials, a UV-emitting LED combined with blue- and yellow-emitting wavelength converting materials, and a UV-emitting LED combined with blue-, green-, and red-emitting wavelength converting materials. Wavelength converting materials emitting other colors of light may be added to tailor the spectrum of light extracted from the structure. The wavelength converting structure 84 may include light scattering or light diffusing elements such as $TiO_2$.

In some embodiments, the wavelength converting structure 84 is a structure that is fabricated separately from the LED and attached to the LED, for example through wafer bonding or a suitable adhesive such as silicone or epoxy. One example of such a pre-fabricated wavelength converting element is a ceramic phosphor, which is formed by, for example, sintering powder phosphor or the precursor materials of phosphor into a ceramic slab, which may then be diced into individual wavelength converting elements. A ceramic phosphor may also be formed by, for example tape casting, where the ceramic is fabricated to the correct shape, with no dicing or cutting necessary. Examples of suitable non-ceramic pre-formed wavelength converting elements include powder phosphors that are dispersed in transparent material such as silicone or glass that is rolled, cast, or otherwise formed into a sheet, then singulated into individual wavelength converting elements, powder phosphors that are disposed in a transparent material such as silicone and laminated over the wafer of LEDs or individual LEDs, and phosphor mixed with silicone and disposed on a transparent substrate. The wavelength converting element need not be pre-formed, it may be, for example, wavelength converting material mixed with transparent binder that is laminated, dispensed, deposited, screen-printed, electrophoretically deposited, or otherwise positioned in the path of light emitted by the LEDs.

The wavelength converting structure 84 need not be disposed in direct contact with the LEDs as illustrated in FIG. 8; in some embodiments, the wavelength converting structure 84 is spaced apart from the LEDs.

The wavelength converting structure 84 may be a monolithic element covering multiple or all LEDs in an array, or may be structured into separate segments, each attached to a corresponding LED. Gaps between these separate segments of the wavelength conversion structure 84 may be filled with optically reflective material to confine light emission from each segment to this segment only.

Interconnects (not shown) such as, for example, solder, stud bumps, gold layers, or any other suitable structure, may be used to electrically and physically connect LEDs 62 in array 60 to a structure such as a mount, a printed circuit board, or any other suitable structure. The mount may be configured such that individual LEDs 62 may be individually controlled by driver 12 of FIG. 1A. The light emitted by the individual LEDs 62 illuminates a different part of the scene. By changing the current to individual LEDs, the light provided to a corresponding part of the scene can be modified. The optimal illuminance profile for the scene, calculated as described above, may be obtained by providing an appropriate level of current to each LED 62.

In some devices such as mobile or battery-powered devices, the maximum amount of current available for adaptive lighting system 1 of FIG. 1A is often limited by the capabilities of the device battery. When defining the drive current levels to all the LEDs 62, system 1 typically takes into account the maximum available current budget, and thereby defines the drive current level for each LED 62 such that the total drive current does not exceed the maximum, while the correct ratio of intensity between the LEDs is maintained and total light output is maximized.

FIG. 9 illustrates a scene to be illuminated in the examples illustrated below in FIGS. 10A, 11A, 12A, 13A, 14A, and 15A. The amount of current provided to each LED 62 for each example is illustrated in FIGS. 10B, 11B, 12B, 13B, 14B, and 15B. The target 88, which may be a face identified by the dashed line in FIG. 9, requires more light than the rest of the scene according to the calculation from the 3D profile as described above. In each of FIGS. 10A, 11A, 12A, 13A, 14A, and 15A, the amount of light provided to a region decreases with increasing darkness of the shading. The light distributions illustrated in each figure may be relative.

FIG. 10A illustrates how the scene is illuminated when all LEDs 62 are supplied with the same amount of current, as illustrated in FIG. 10B. The center of the scene is brightly illuminated, while the outer edges of the scene are less illuminated. Accordingly, the portion of the target near the center of the scene is more illuminated than the portion of the target near the edge of the scene.

Figure 11A:
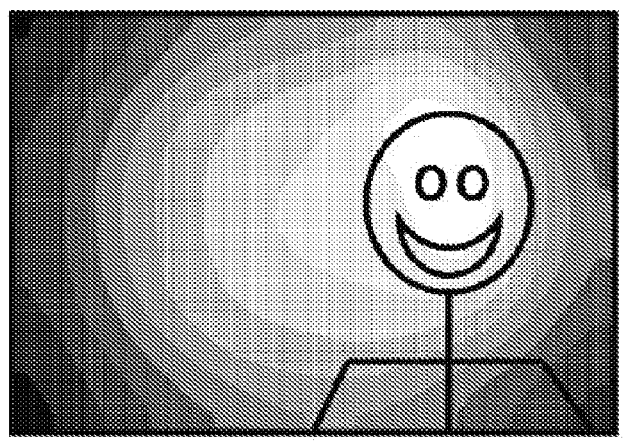
Figure 11B:
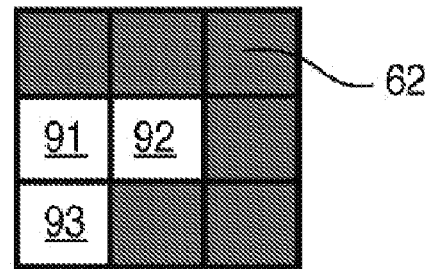

FIG. 11A illustrates how the scene is illuminated when only three LEDs are supplied with current, each of the three receiving the same amount of current, while the other six LEDs receive no current. The three LEDs 91, 92, and 93 supplied with current are the center LED, and the two bottom LEDs in the left-most column, as illustrated in FIG. 11B. As illustrated in FIG. 11A, the right side of the scene, corresponding roughly to the target, is more brightly illuminated than the rest of the scene. The current density for LEDs 91, 92, and 93 in FIG. 11B may be three times higher than the case illustrated in FIG. 10B, where all LEDs are supplied with equal current. The illuminance of the target in FIG. 11A is about 1.6 times higher than the illuminance of the target in FIG. 10A.

To obtain higher illuminance, fewer segments can be switched on, as illustrated in two examples shown in FIGS. 12A, 12B, 13A, and 13B.

Figure 12A:
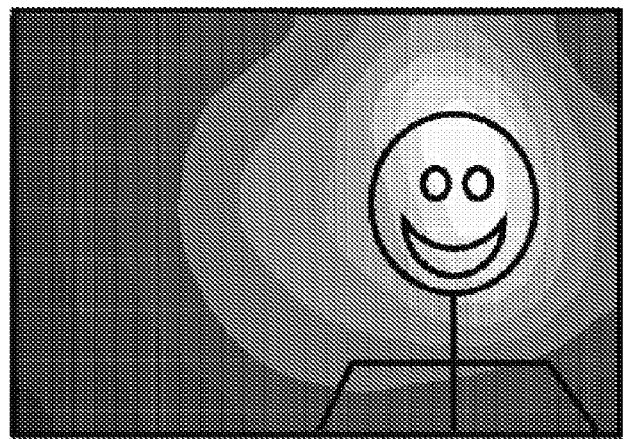
Figure 12B:
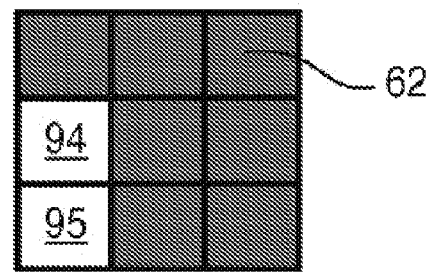

FIG. 12A illustrates how the scene is illuminated when only two LEDs are supplied with current, each receiving the same amount of current, while the other seven LEDs receive no current. The two LEDs 94 and 95 supplied with current are the two bottom LEDs in the left-most column, as illustrated in FIG. 12B. As illustrated in FIG. 12A, the right side of the scene, corresponding roughly to the target, is more brightly illuminated than the rest of the scene. The illuminance of the target in FIG. 12A is greater than the illuminance of the target in FIG. 11A.

Figure 13A:
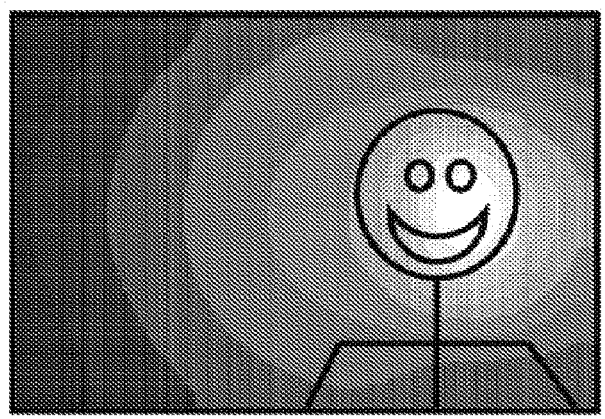
Figure 13B:
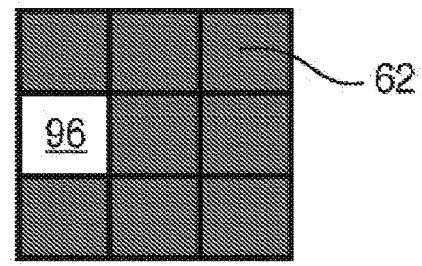

FIG. 13A illustrates how the scene is illuminated when only a single LED is supplied with current while the other eight LEDs receive no current. The LED 96 supplied with current is the center LED in the left-most column, as illustrated in FIG. 13B. As illustrated in FIG. 13A, the right side of the scene, corresponding roughly to the target, is more brightly illuminated than the rest of the scene, though the highly illuminated spot is smaller than in FIGS. 12A and 11A. The illuminance of the target in FIG. 13A is greater than the illuminance of the target in FIG. 11A.

To improve the uniformity of illuminance across the entire target, the current supplied to different LEDs may be varied, as illustrated in two examples shown in FIGS. 14A, 14B, 15A, and 15B.

Figure 14A:
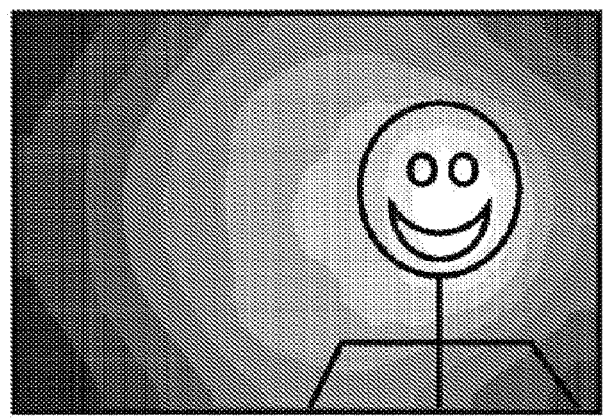
Figure 14B:
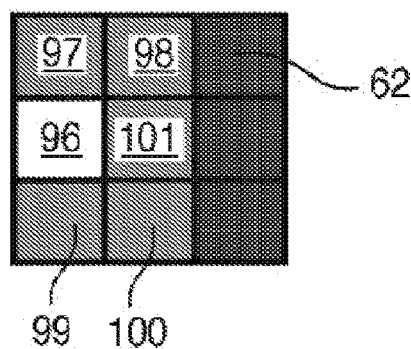

FIG. 14A illustrates how the scene is illuminated when six LEDs are supplied with varying levels of current and three LEDs receive no current. The center LED 96 in the left column is supplied with five times more current than the five LEDs 97, 98, 99, 100, and 101 which surround LED 96. The three LEDs in the right column receive no current, as illustrated in FIG. 14B. As illustrated in FIG. 14A, the right side of the scene, corresponding roughly to the target, is more brightly illuminated than the rest of the scene. The illuminance of the target is more uniform than in, for example, FIG. 13A.

Figure 15A:
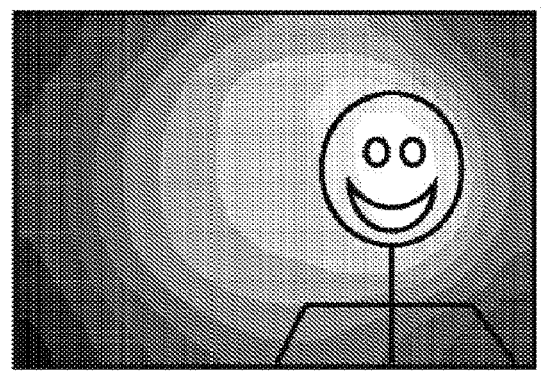
Figure 15B:
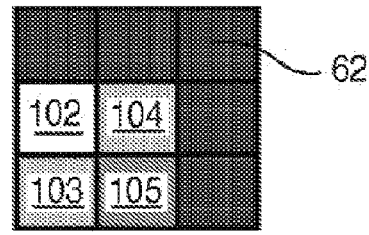

FIG. 15A illustrates how the scene is illuminated when four LEDs are supplied with varying levels of current and five LEDs receive no current. The center LED 102 in the left column is supplied with four times more current than the bottom LED 105 in the center column, and with twice as much current as the center LED 104 and the bottom LED 103 in the left column. The top row of LEDs and the LEDs in the right column receive no current, as illustrated in FIG. 15B. As illustrated in FIG. 15A, the right side of the scene, corresponding roughly to the target, is more brightly illuminated than the rest of the scene. The illuminance of the target is more uniform than in, for example, FIG. 13A.

Figure 16:
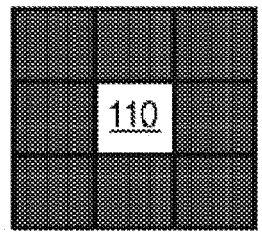
FIGS. 16, 17A, and 17B illustrate the amount of current applied to the LEDs in the array of FIG. 7 to generate illuminance profiles for a zooming application.
Figure 17A:
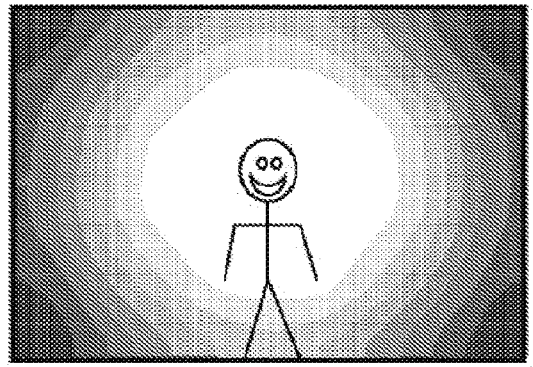
Figure 17B:
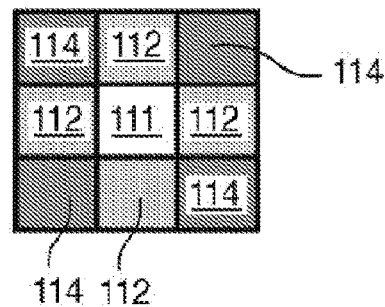

FIGS. 16, 17B, and 18B illustrate how current may be applied to array 60 of LEDs 62 in FIG. 6, for zoom and wide angle applications. When a command to zoom in the camera lens is received, LEDs near the center of the array receive more current, as illustrated in FIGS. 16 and 17B. FIG. 17A illustrates how the scene is illuminated when the LEDs are supplied with varying levels of current as illustrated in FIG. 17B.

When a command to zoom out the camera lens is received, LEDs near the edge of the array receive more current, as illustrated in FIG. 18B. FIG. 18A illustrates how the scene is illuminated when the LEDs are supplied with varying levels of current as illustrated in FIG. 18B.

In FIG. 16, for a zoom application, just the center LED 110 is supplied with current, while the eight LEDs surrounding the center LED receive no current. The center of the scene will be brightly illuminated, while the edges of the scene will receive less light. Illuminance at the center of the scene may be increased by 2.2 times over the center of the scene in FIG. 10A, where all nine LEDs receive equal current.

In FIG. 17B, for a zoom application, the center LED 111 is supplied with twice as much current as LEDs 112, and four times as much current as LEDs 114. The center of the scene is more illuminated than the edges of the scene. Illuminance at the center of the scene may be increased by 1.15 times over the center of the scene in FIG. 10A, where all nine LEDs receive equal current.

In FIG. 18B, for a wide-angle application, the eight LEDs 118 at the edges of the array receive equal current, while the center LED 116 receives no current. Illuminance at the center of the scene may be reduced to 0.85 times the illuminance at the center of the scene in FIG. 10A, where all nine LEDs receive equal current.

Adaptive lighting system 1 of FIG. 1A may be used to illuminate multiple targets (e.g., faces), by providing current to only the LEDs corresponding to each target, or by providing more current to the LEDs corresponding to each target. Adaptive lighting system 1 may be used to reduce overexposure in a scene containing elements that are close to the camera and far from the camera, by providing current to only the LEDs corresponding to the elements far from the camera, or by providing more current to the LEDs corresponding to the elements far from the camera.

The illuminance values given for the examples above are calculated for the illustrated 3×3 array with a single Fresnel lens. The light output of each LED in the examples above can be controlled by the driver current of the LED, or by pulse duration with a fixed current.

FIGS. 19, 20, 21, 22, and 23 illustrate alternative light sources.

In the light source of FIG. 19, each LED 62 in the array has an individual optic 122, rather than a single optic for the entire array, as illustrated in FIG. 6. Each optic 122 directs light from its LED to a specific portion of the scene. Optics 122 may be any suitable optic including, for example, lenses, dome lenses, Fresnel lenses, reflectors, total internal reflection lenses, or any other suitable structure. Optics 122 need not be identical; different optics may be used for different LEDs 62 in the array.

The light source of FIG. 20 includes multiple LED arrays with multiple optical elements. For example, FIG. 20 illustrates two 3×3 arrays, each with a single corresponding Fresnel lens. More or fewer arrays may be used, and the arrays are not limited to the device illustrated. In some embodiments, each array illuminates a part of the scene. Array 124 in FIG. 20 illuminates the top 128 of the scene, while array 126 illuminates the bottom 130 of the scene. In some embodiments, the arrays illuminate overlapping parts of the scene, in order to provide more light to the overlapping parts. For example, the arrays may overlap in the center of the scene, which may be a part of the scene that often requires more light than the edges.

Figure 21:
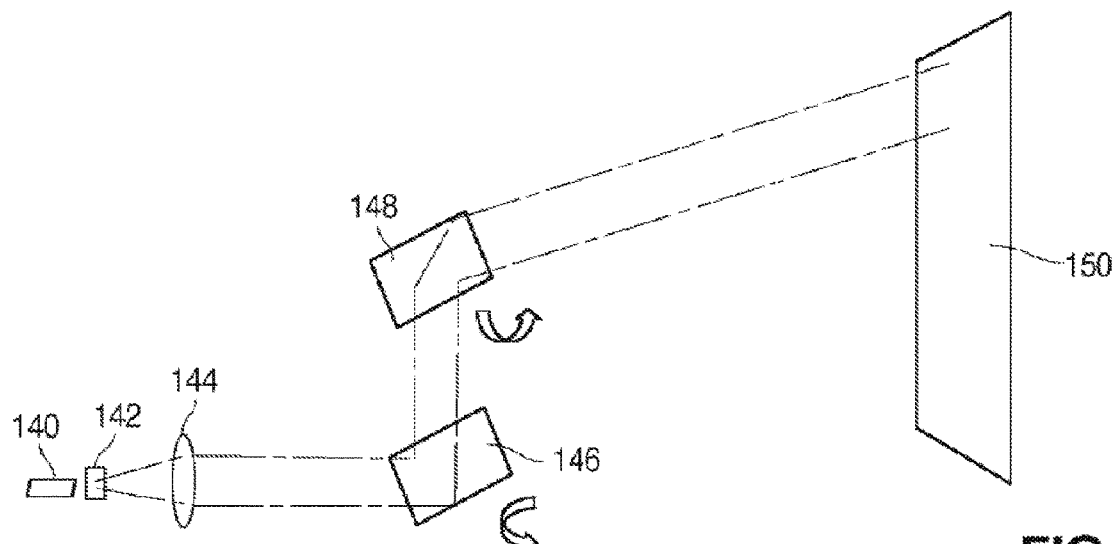
FIG. 21 illustrates a scanning, narrow-beam light source.

The light source of FIG. 21 uses a narrow-beam light emitting device such as, for example, a laser. The light source of FIG. 21 includes a laser 140 with a wavelength converting element 142 disposed in the path of the light from the laser. Focusing optics 144 may create a light beam of the desired size. The beam is incident on a first scanning mirror 146, and a second scanning mirror 148, before being incident on the scene 150. The scanning mirrors may be moved such that the light beam scans the entire scene, while the driver controls the intensity of the light source, such that different parts of the scene may receive different amounts of light. When the beam scans parts of the scene requiring higher intensity, the current supplied to the laser increases; when the beam scans parts of the scene requiring lower intensity, the current supplied to the laser decreases.

Figure 22:
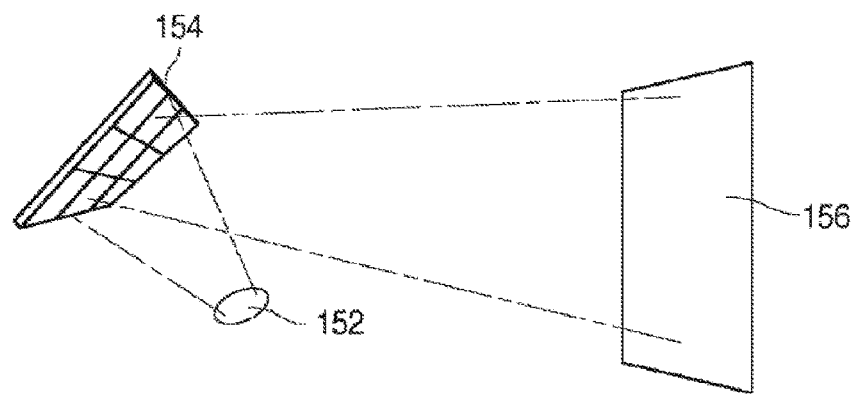
FIG. 22 illustrates a light source with a matrix control element.

The light source of FIG. 22 includes a matrix control element, such as a digital micromirror switching device or a multi-segment liquid crystal display. Light from an LED or laser 152 illuminates the matrix control element 154. The intensity of the reflected or transmitted light is modified depending on the calculated illuminance profile. The reflected or transmitted light from the matrix switching element 154 is projected onto the scene 156. Matrix switching element 154 may have many small mirrors as pixels. The orientation of each mirror can be changed to tune the intensity at each pixel. The orientation of the mirrors may also be used to create brighter regions, by overlapping the beams from different mirrors.

Figure 23:
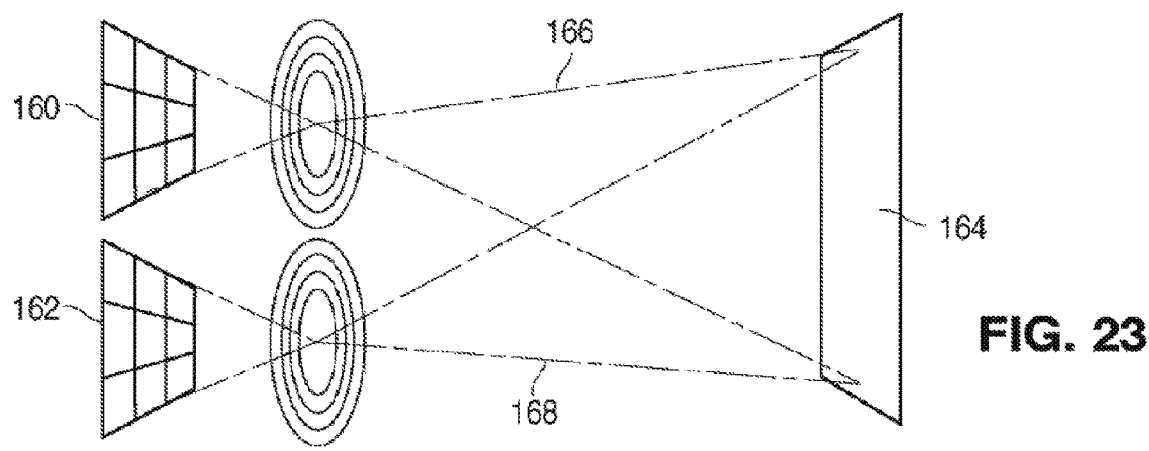
FIG. 23 illustrates a light source with light emitters that emit light of different colors or color temperatures.

The light source of FIG. 23 is color tunable. The light source of FIG. 23 includes two arrays, 160 and 162, which are arranged to emit beams 166 and 168, respectively, which overlap when they illuminate the scene 164. Though two arrays like the array illustrated in FIG. 6 are illustrated, other suitable light emitters may be used. The system may include 3 or more arrays with different emission spectra. Arrays 160 and 162 emit different colors of light. For example, arrays 160 and 162 may both emit white light, though array 160 may emit white light with a different color temperature than array 162—i.e., one of array 160 and array 162 emits warm white light. For example, the array that emits warm white light may emit light with a color temperature as low as 1700 K, and the array that emits cool white light may emit light with a color temperature as high as 10000 K. The difference in color temperature between the two arrays may be at least 1000 K in some embodiments, at least 2000 K in some embodiments, at least 3000 K in some embodiments, and at least 4000 K in some embodiments. Alternatively, arrays 160 and 162 may emit different monochromatic colors of light. The appropriate current supplied to each LED in each array is calculated such that the sum of light from arrays 160 and 162 has the appropriate illuminance and color temperature for each portion of the scene. Arrays (or other light emitters) emitting additional colors or color temperatures of light may be added.

In some embodiments, LEDs emitting multiple spectra may be combined in a single, interleaved array, with a single optic as illustrated in FIG. 6 or with individual optics as illustrated in FIG. 19. LEDs of different colors may be arranged in groups, each group illuminating a portion of the scene, each group including at least one LED of each different color.

The color tunable light source described above may be used to illuminate different parts of the scene with light of different correlated color temperature (CCT). For example, a color tunable light source may be used to equalize the CCT of different ambient illuminants. The sections of the scene with low CCT ambient light may be illuminated with higher CCT light, while the sections of the scene with high CCT ambient light may be illuminated with lower CCT light.

In some embodiments, light source 10 may be used with different cameras. For example, a smart phone may have multiple cameras, or different smart phone models may use different cameras. The cameras may each have a specific field of view, for which the flash for that camera is tuned (for example, tuned to provide a minimum level of illumination in the corner of the field of view). Accordingly, for a conventional flash, each camera requires a separate flash that is tuned to that camera's field of view. With adaptive lighting system according to embodiments of the invention, a default current distribution for each camera could be defined and selected when that camera is selected, such that a single light source may be used for multiple cameras. The default for each camera may be modified according to the scene being photographed, as described in the embodiments above.

Though in the examples above the semiconductor light emitting device are III-nitride LEDs that emit blue or UV light and III-arsenide LEDs that emit IR light, semiconductor light emitting devices besides LEDs such as laser diodes and semiconductor light emitting devices made from other materials systems such as other III-V materials, III-phosphide, II-VI materials, ZnO, or Si-based materials may be used.

Having described the invention in detail, those skilled in the art will appreciate that, given the present disclosure, modifications may be made to the invention without departing from the spirit of the inventive concept described herein. In particular, different elements from different examples or embodiments may be combined. It is not intended that the scope of the invention be limited to the specific embodiments illustrated and described.

The invention claimed is:

1. A system, comprising:
    a camera having a field of view;
    an array of light-emitting diodes (LEDs) configured to produce infrared light;

an array of lenses coupled to the array of LEDs, the array of lenses configured to direct the infrared light toward the field of view of the camera;

a controller configured to selectively power the array of LEDs to selectively illuminate the field of view, such that infrared light from each LED is directed toward a respective portion in the field of view;

at least one processor; and memory coupled to the at least one processor, the memory configured to store instructions that, when executed by the at least one processor, cause the at least one processor to execute operations, the operations comprising:

controlling the camera to capture a first image of a scene positioned within the field of view of the camera;

determining, with the at least one processor, from the first image, that a face of a person is present in a first portion of the field of view;

selecting, with at least one processor, a subset of LEDs of the array of LEDs, the subset of LEDs being positioned in the array such that infrared light emitted from the subset of LEDs is directed toward the first portion of the field of view to illuminate the face of the person with the infrared light;

selectively powering, with the controller, the subset of LEDs in the array, the subset being configured to direct infrared light toward the first portion of the field of view to illuminate the face of the person with the infrared light;

capturing, with the camera, with the subset of LEDs being powered, a second image of the scene, the second image including the face of the person illuminated with the infrared light; and determining, with the at least one processor, from the second image, an identity of the person in the first image and the second image.

2. The system of claim 1, wherein the operations further comprise:
controlling the controller to capture the first image by powering each LED in the array such that at least two LEDs in the array are powered with differing current values.

3. The system of claim 1, wherein the operations further comprise:
controlling the controller to capture the first image by powering each LED in the array with a same first current value.

4. The system of claim 3, wherein the operations further comprise:
determining, with the at least one processor, from the first image, that the face of the person is underexposed in the first image; and
determining, with the at least one processor, from the first image, a second current value greater than the first value,
wherein the controller powers the subset of LEDs with the second current value.

5. The system of claim 4, wherein a number of LEDs in the array multiplied by the first current value substantially equals a number of LEDs in the subset multiplied by the second current value.

6. The system of claim 3, wherein the operations further comprise:
determining, with the at least one processor, from the first image, that the face of the person is overexposed in the first image; and
determining, with the at least one processor, from the first image, a second current value less than the first value,
wherein the controller powers the subset of LEDs with the second current value.

7. The system of claim 6, wherein a number of LEDs in the array multiplied by the first current value substantially equals a number of LEDs in the subset multiplied by the second current value.

8. The system of claim 1, further comprising an input device configured to trigger the capturing of the first image in response to an input.

9. The system of claim 8, wherein the input device is a button positioned on the camera and the input is a depression of the button.

10. The system of claim 1, wherein the subset of LEDs includes a plurality of LEDs.

11. The system of claim 1, wherein when the second image is captured, the controller powers only the subset of LEDs in the array.

12. The system of claim 1, wherein the LEDs are formed from a III-V compound semiconductor.

13. The system of claim 1, wherein the LEDs are formed from GaAs.

14. The system of claim 1, wherein the lenses are Fresnel lenses.

15. A method, comprising:
capturing, with a camera, a first image of a scene positioned within a field of view of the camera;
determining, with at least one processor coupled to the camera, from the first image, that a face of a person is present in a first portion of the field of view;
selecting, with at least one processor, a subset of light-emitting diodes (LEDs) of an array of LEDs, the subset of LEDs being positioned in the array such that infrared light emitted from the subset of LEDs is directed toward the first portion of the field of view to illuminate the face of the person with the infrared light;
selectively powering, with a controller coupled to an array of light-emitting diodes (LEDs), the subset of LEDs in the array;
directing infrared light from the subset of LEDs, through an array of lenses coupled to the array of LEDs, toward the first portion of the field of view to illuminate the face of the person with the infrared light;
capturing, with the camera, with the subset of LEDs being powered, a second image of the scene, the second image including the face of the person illuminated with the infrared light; and
determining, with the at least one processor, from the second image, an identity of the person in the first image and the second image.

16. The method of claim 15, further comprising:
determining, with the at least one processor, from the first image, that the face of the person is underexposed in the first image; and
determining, with the at least one processor, from the first image, a second current value greater than the first value,
wherein the controller powers the subset of LEDs with the second current value.

17. The method of claim 16, wherein a number of LEDs in the array multiplied by the first current value substantially equals a number of LEDs in the subset multiplied by the second current value.

18. The method of claim 15, further comprising:
determining, with the at least one processor, from the first image, that the face of the person is overexposed in the first image; and
determining, with the at least one processor, from the first image, a second current value less than the first value, wherein the controller powers the subset of LEDs with the second current value.

19. The method of claim 18, wherein a number of LEDs in the array multiplied by the first current value substantially equals a number of LEDs in the subset multiplied by the second current value.

20. A system, comprising:
a camera having a field of view;
an array of light-emitting diodes (LEDs) configured to produce infrared light;
an array of lenses coupled to the array of LEDs, the array of lenses configured to direct the infrared light toward the field of view of the camera;
a controller configured to selectively power the array of LEDs to selectively illuminate the field of view, such that infrared light from each LED is directed toward a respective portion in the field of view;
at least one processor; and
memory coupled to the at least one processor, the memory configured to store instructions that, when executed by the at least one processor, cause the at least one processor to execute operations, the operations comprising:

powering, with the controller, each LED in the array with a first current value;
controlling the camera to capture, with the array of LEDs being powered with the first current value, a first image of a scene positioned within the field of view of the camera;
determining, with the at least one processor, from the first image, that a face of a person is present in a first portion of the field of view;
selecting, with at least one processor, a subset of LEDs of the array of LEDs, the subset of LEDs being positioned in the array such that infrared light emitted from the subset of LEDs is directed toward the first portion of the field of view to illuminate the face of the person with the infrared light;
selectively powering, with the controller, each LED in the subset with a second current value different from the first current value, the subset being configured to direct infrared light toward the first portion of the field of view to illuminate the face of the person with the infrared light;
capturing, with the camera, with the subset of LEDs being powered with the second current value, a second image of the scene, the second image including the face of the person illuminated with the infrared light; and
determining, with the at least one processor, from the second image, an identity of the person in the first image and the second image.

* * * * *

UNITED STATES PATENT AND TRADEMARK OFFICE
CERTIFICATE OF CORRECTION

Page 1 of 1

PATENT NO. : 11,184,552 B2
APPLICATION NO. : 16/597978
DATED : November 23, 2021
INVENTOR(S) : VanDer Sijde et al.

It is certified that error appears in the above-identified patent and that said Letters Patent is hereby corrected as shown below:

On the Title Page

On page 2, in Column 2, Item (56) under "Other Publications", Line 63, delete "20181043851.0," and insert --201810437851.0,-- therefor Signed and Sealed this
Eighteenth Day of January, 2022

Drew Hirshfeld
*Performing the Functions and Duties of the*
*Under Secretary of Commerce for Intellectual Property and*
*Director of the United States Patent and Trademark Office*